(12) United States Patent
Brodbeck et al.

(10) Patent No.: US 12,119,688 B2
(45) Date of Patent: Oct. 15, 2024

(54) DUAL POLE HIGH VOLTAGE DISCONNECT

(71) Applicant: Caterpillar Inc., Peoria, IL (US)

(72) Inventors: Jared J. Brodbeck, Metamora, IL (US); Jason Lee Miller, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 128 days.

(21) Appl. No.: 17/893,512

(22) Filed: Aug. 23, 2022

(65) Prior Publication Data

US 2024/0072551 A1 Feb. 29, 2024

(51) Int. Cl.
 *H02J 7/00* (2006.01)
 *H02J 7/14* (2006.01)

(52) U.S. Cl.
 CPC .......... *H02J 7/0031* (2013.01); *H02J 7/1423* (2013.01); *H02J 2310/48* (2020.01)

(58) Field of Classification Search
 None
 See application file for complete search history.

(56) References Cited

U.S. PATENT DOCUMENTS

| | | | |
|---|---|---|---|
| 7,084,361 B1 | 8/2006 | Bowes et al. | |
| 8,717,731 B2 | 5/2014 | Reid et al. | |
| 10,274,532 B1 | 4/2019 | Smith et al. | |
| 10,985,548 B2 | 4/2021 | Telefus | |
| 2019/0057828 A1 | 2/2019 | Gurtner et al. | |
| 2020/0274375 A1* | 8/2020 | Griffiths | H02J 7/24 |
| 2021/0118629 A1 | 4/2021 | Burkett et al. | |
| 2021/0129691 A1 | 5/2021 | Gorantla Narayana Murthy | |
| 2021/0194221 A1 | 6/2021 | Wise et al. | |
| 2022/0360094 A1* | 11/2022 | Berning | H02J 7/0031 |

(Continued)

FOREIGN PATENT DOCUMENTS

| | | |
|---|---|---|
| CN | 105633730 A | 6/2016 |
| CN | 109039162 | 12/2018 |
| CN | 113954644 A | 1/2022 |

(Continued)

OTHER PUBLICATIONS

Anonymous:"BGI/GUV-I 8686—Qualifizierung fur Arbeiten an Fahrzeugen mit Hochvoltsystemen", Apr. 30, 2012 (Apr. 30, 2012), pp. 1-80, XP055146714, Retrieved from the Internet: URL:http://publikationen.dguv.de/dguv/pdf/10002/i-8686.pdf [retrieved on Oct. 15, 2014] p. 12.

(Continued)

*Primary Examiner* — Jared Fureman
*Assistant Examiner* — Aqeel H Bukhari
(74) *Attorney, Agent, or Firm* — Schwegman, Lundberg & Woessner

(57) ABSTRACT

An example energy source for a work machine includes multiple battery cells connectable in parallel to form a battery system having a high pole and a low pole, a load bus to distribute energy from the battery system to the work machine, and a single point of connection between the battery system and the load bus. The single point of connection is a connector including a dual-pole single-throw (DPST) switch. The DPST switch includes a dual-switched circuit path to connect the high pole and the low pole to the load bus, and a single-switched circuit path to provide a switched connection of a high voltage interlock loop (HVIL) circuit.

18 Claims, 5 Drawing Sheets

(56) References Cited

U.S. PATENT DOCUMENTS

2023/0311788 A1* 10/2023 Jackson ............... H02G 3/0633
307/10.1

FOREIGN PATENT DOCUMENTS

| DE | 102011086495 A1 | 5/2013 |
| DE | 102012215066 A1 | 2/2014 |
| EP | 0602804 | 6/1994 |
| WO | 0013275 | 3/2000 |

OTHER PUBLICATIONS

Written Opinion and International Search Report for Int'l. Patent Appln. No. PCT/US2023/070993, mailed Nov. 17, 2023 (17 pgs).

* cited by examiner

DUAL POLE HIGH VOLTAGE DISCONNECT

TECHNICAL FIELD

This document relates to electric powered work machines and in particular to techniques of safely connecting to the energy source of the work machines.

BACKGROUND

Powering a large moving work machine (e.g., a wheel loader) with an electric motor requires a mobile electric energy source that can provide current of hundreds to thousands of Amperes (A) at hundreds to thousands of volts (V). This mobile energy source can include multiple large capacity battery cells connected in parallel as battery strings that provide the sustained energy power needed by a large electric-powered moving work machine. High-capacity cables connect to the energy source and route the electric power between various compartments of the work machine. Because the large-capacity energy source includes batteries, the energy source does not shut off. Therefore, electric work machines need a safe reliable technique to disconnect the large-capacity energy source.

SUMMARY OF THE INVENTION

Electric powered large moving work machines use a large capacity energy source that sources high voltage electrical energy to the work machine. The large capacity energy sources can be based on large capacity batteries that do not shut off. Equipment can be damaged if the large capacity energy source is not disabled safely when performing maintenance on the work machine. Also, maintenance of work machines poses a threat of injury to workers from the high voltages and currents of the large capacity energy source.

An example energy source for a work machine includes multiple battery cells connectable in one or any combination of series and parallel to form a battery system having a high pole and a low pole, a load bus to distribute energy from the battery system to the work machine, and a single point of connection between the battery system and the load bus. The single point of connection is a connector including a dual-pole single-throw (DPST) switch. The DPST switch includes a dual-switched circuit path to connect the high pole and the low pole to the load bus, and a single-switched circuit path to provide a switched connection of a high voltage interlock loop (HVIL) circuit.

An example high current electrical connector for connecting a large-capacity energy source to a work machine includes a DPST switch. The DPST switch includes first and second contacts to be connected to a first pole and a second pole of the large-capacity energy source, third and fourth contacts to be connected to electrical circuits of the work machine, and fifth and sixth contacts to connect an HVIL circuit to the connector. The first, second, third, and fourth contacts are rated for three hundred amps or higher.

An example dual pole electrical connector includes a DPST switch rated to seven hundred volts (700V) or higher. The DPST switch includes first and second contacts to be connected to a first pole and a second pole of an energy source, third and fourth contacts to be connected to electrical circuits of the work machine; and fifth and sixth contacts to connect an HVIL circuit to the connector. When closing the DPST switch, the fifth contact is connected to the sixth contact after the first contact is connected to the third contact and the second contact is connected to the fourth contact, and when opening the DPST switch, the fifth contact is disconnected from the sixth contact before the first contact is disconnected from the third contact and the second contact is disconnected from the fourth contact.

DETAILED DESCRIPTION

Examples according to this disclosure are directed to methods and devices for managing high voltage electrical energy provided to electrical circuits and electrical motors of a work machine. Techniques for centralized connecting and disconnecting of the large capacity energy system of a mobile work machine are described.

Figure 1:
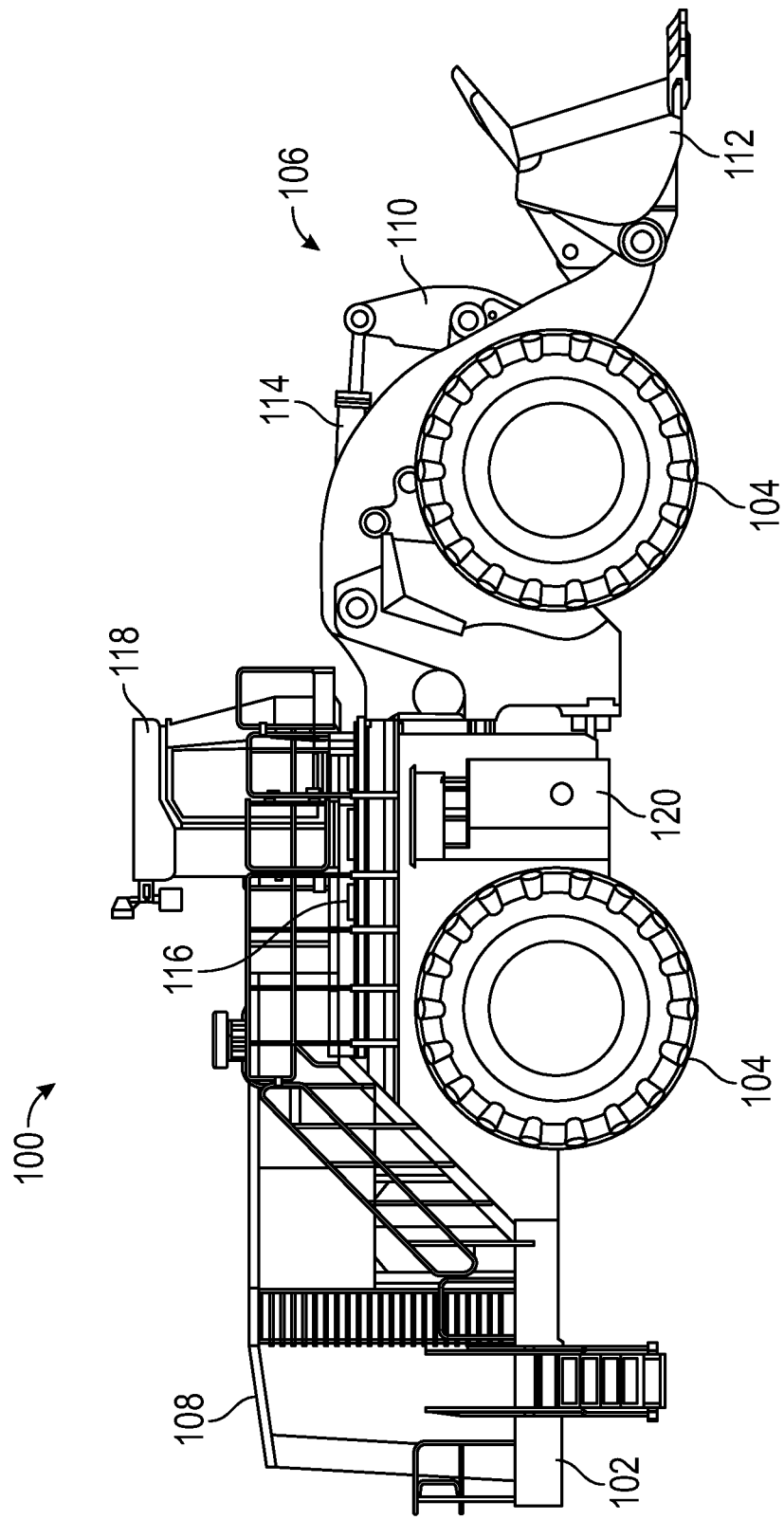
FIG. 1 is an elevation view depicting an example work machine in accordance with this disclosure.

FIG. 1 depicts an example machine 100 in accordance with this disclosure. In FIG. 1, machine 100 includes frame 102, wheels 104, implement 106, and a speed control system implemented in one or more on-board electronic devices like, for example, an electronic control unit or ECU. Example machine 100 is a wheel loader. In other examples, however, the machine may be other types of machines related to various industries, including, as examples, construction, agriculture, forestry, transportation, material handling, waste management, and so on. Accordingly, although a number of examples are described with reference to a wheel loader machine, examples according to this disclosure are also applicable to other types of machines including graders, scrapers, dozers, excavators, compactors, material haulers like dump trucks, along with other example machine types.

Machine 100 includes frame 102 mounted on four wheels 104, although, in other examples, the machine could have more than four wheels. Frame 102 is configured to support and/or mount one or more components of machine 100. For example, machine 100 includes enclosure 108 coupled to frame 102. Enclosure 108 can house, among other components, an electric motor to propel the machine over various terrain via wheels 104. In some examples, multiple electric motors are included in multiple enclosures at multiple locations of the machine 100.

Machine 100 includes implement 106 coupled to the frame 102 through linkage assembly 110, which is configured to be actuated to articulate bucket 112 of implement 106. Bucket 112 of implement 106 may be configured to transfer material such as, soil or debris, from one location to another. Linkage assembly 110 can include one or more cylinders 114 configured to be actuated hydraulically or pneumatically, for example, to articulate bucket 112. For example, linkage assembly 110 can be actuated by cylinders 114 to raise and lower and/or rotate bucket 112 relative to frame 102 of machine 100.

Platform 116 is coupled to frame 102 and provides access to various locations on machine 100 for operational and/or maintenance purposes. Machine 100 also includes an operator cabin 118, which can be open or enclosed and may be accessed via platform 116. Operator cabin 118 may include one or more control devices (not shown) such as, a joystick, a steering wheel, pedals, levers, buttons, switches, among other examples. The control devices are configured to enable the operator to control machine 100 and/or the implement 106. Operator cabin 118 may also include an operator interface such as, a display device, a sound source, a light source, or a combination thereof.

Machine 100 can be used in a variety of industrial, construction, commercial or other applications. Machine 100 can be operated by an operator in operator cabin 118. The operator can, for example, drive machine 100 to and from various locations on a work site and can also pick up and deposit loads of material using bucket 112 of implement 106. As an example, machine 100 can be used to excavate a portion of a work site by actuating cylinders 114 to articulate bucket 112 via linkage 110 to dig into and remove dirt, rock, sand, etc. from a portion of the work site and deposit this load in another location. Machine 100 can include a battery compartment connected to frame 102 and including a battery system 120. Battery system 120 is electrically coupled to the one or more electric motors of the machine 100.

The battery system 120 can include multiple large capacity battery cells (e.g., 750 Volt, 80 Amp-hour, or 60 kilowatt-hours) to provide a high-capacity electrical energy source. The battery cells 224 may be included in one battery pack or multiple battery packs connected in parallel in the battery system. In some examples, the battery system includes fuel cells that provide a high-capacity electrical energy source. The machine 100 may include multiple battery systems.

A battery system 120 may be used to provide a high voltage, high direct current (DC) electrical energy source (e.g., 700V-3000V and 300 A-1000$^+$ A). The output of the battery system may be provided to a converter or inverter to produce a high voltage, high alternating current (AC) electrical energy source. The energy source or sources provide electrical power to electrical motors, pumps, circuits, etc., of the machine 100.

Figure 2:
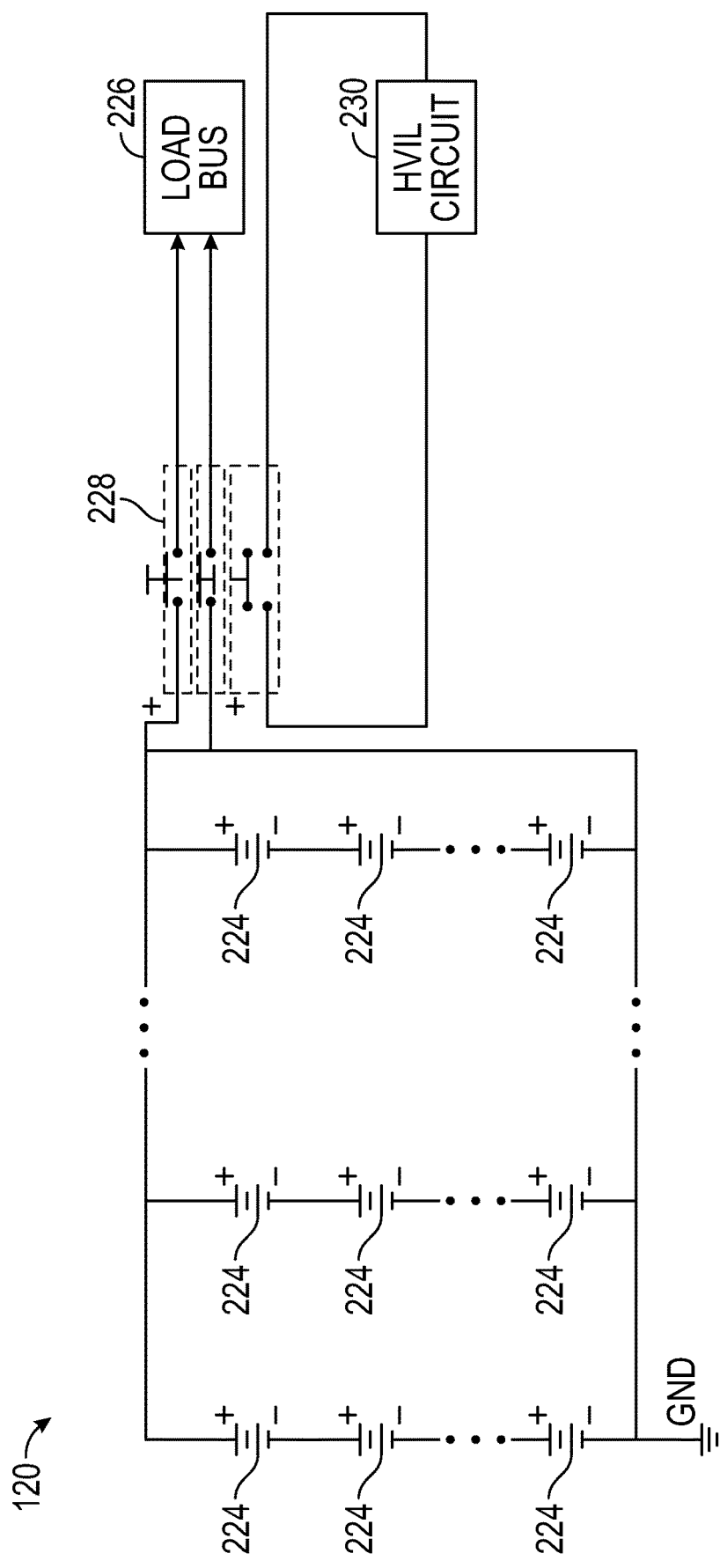
FIG. 2 is a schematic of an energy source for a work machine in accordance with this disclosure.

FIG. 2 is a block diagram of a battery system 120. The battery system 120 can be included in a mobile large-capacity energy source used to provide power to an electric motor of a work machine, such as the example machine 100 of FIG. 1. The battery system 120 includes multiple battery cells 224 (e.g., two to eight battery cells) connected in series and parallel to form a high pole (+) and a low pole (−) of the battery system 120. The battery cells 224 are large capacity battery cells (e.g., a 750 Volt, 80 Amp-hour battery, or 60 kilowatt-hours). The battery cells 224 may be included in one battery pack or multiple battery packs connected in parallel and series in the battery system 120. In an illustrative example intended to be non-limiting, a battery module can include eighteen battery cells connected in series and two battery cells connected in parallel. Thirteen of the battery modules can be connected in series in a battery string with three battery strings per battery pack, and two battery packs for the work machine. Other battery systems can use different arrangements of battery cells, battery modules, battery strings and battery packs.

Because the large-capacity energy source includes batteries or fuel cells, the energy source does not shut off like a combustion engine. Therefore, electric work machines need a safe reliable technique to disconnect the large-capacity energy source. The techniques should allow for lockout/tagout procedures to reliably ensure that the energy source stays disabled during maintenance of the work machine.

The battery system 120 provides high-voltage high-current electrical energy to a load bus 226. The load bus 226 provides electrical power to the compartments distributed about the mobile work machine 100. The energy source includes a single point of connection between the battery system 120 and the load bus 226. This connector includes a double-pole single-throw (DPST) switch 228. The DPST 228 includes a dual-switched circuit path to connect the high pole and low pole of the battery system 120 to the load bus 226. The DPST switch includes four main contacts that connect to the high and low poles of the battery system 120 and the load bus 226. Double-pole activation connects the high pole and low pole of the battery system to the load bus 226 at the same time.

The work machine 100 also includes a high voltage interlock loop (HVIL) circuit 230. The HVIL circuit 230 is a low voltage circuit loop that monitors the high voltage connectors of the work machine 100. Interruption of the HVIL circuit indicates a problem with a high voltage connector.

The DPST switch 228 includes a single-switched circuit path to provide a switched connection to the HVIL circuit 230. Auxiliary contacts of the DPST switch 228 connect to the HVIL circuit 230. The dual-switched circuit path needs to withstand the high output current and voltage of the battery system 120. For example, the dual-switched circuit path may be rated for one or both of 700V and higher, or 300 A and higher. The single-switched circuit path can be rated lower for the lower voltage of the HVIL circuit 230.

When the DPST switch 228 is closed, the HVIL circuit 230 is connected after the high pole and the low pole are connected to the load bus, i.e., the auxiliary contacts of the switch are connected after the main contacts of the switch are connected. When the DPST switch 228 is opened, the HVIL circuit 230 is disconnected before the high pole and the low pole are disconnected from the load bus 226.

Figure 3A:
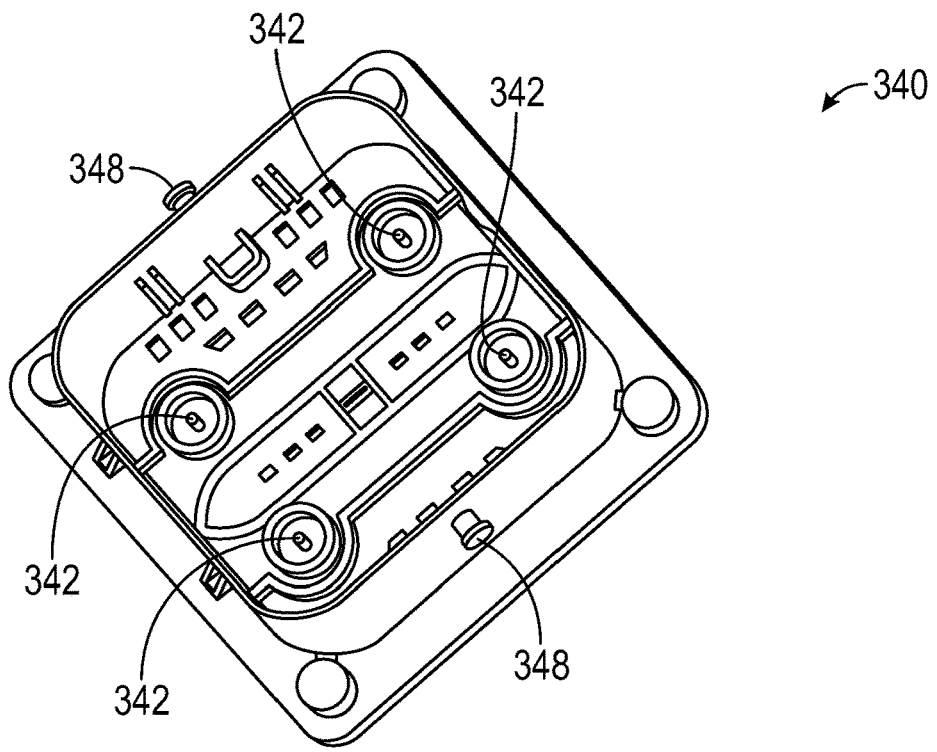
FIGS. 3A and 3B are an example of a plug receptacle for a high current electrical connector in accordance with this disclosure.
Figure 3B:
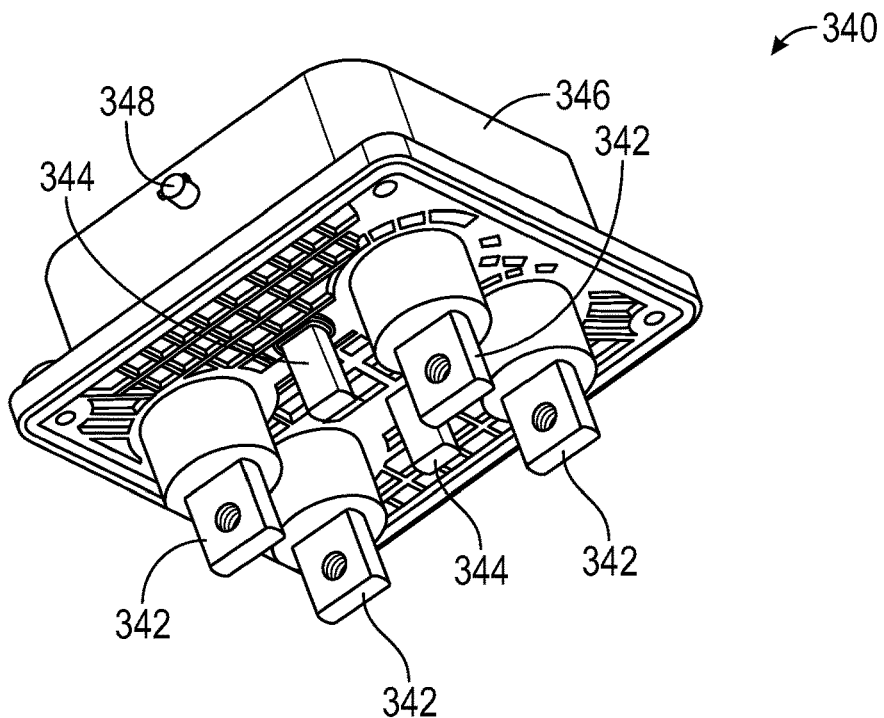

In some examples, a DPST removable link is used as the DPST switch 228 in FIG. 2. FIGS. 3A, 3B, 4A, 4B show an example of a DPST removable link that includes a plug and a plug receptacle. FIGS. 3A and 3B show an example of the plug receptacle 340. The plug receptacle 340 includes two main electrical contacts 342 to connect to the battery system 120, two main electrical contacts to connect to the load bus 226, and two auxiliary contacts 344 for connection to the HVIL circuit 230.

Figure 4A:
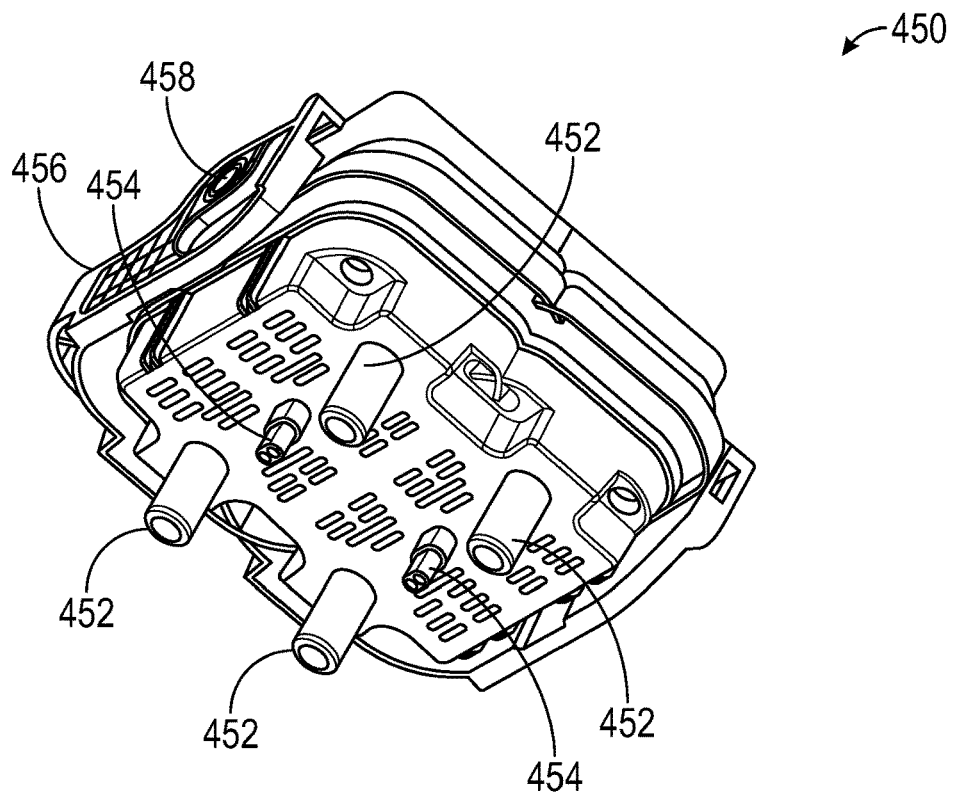
FIGS. 4A and 4B are an example of a plug for a high current electrical connector in accordance with this disclosure.
Figure 4B:
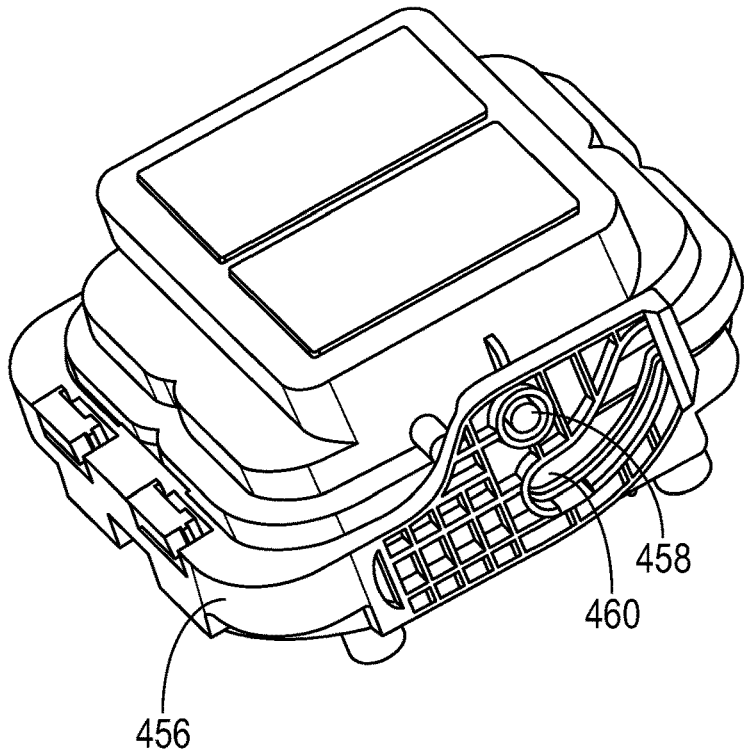

FIGS. 4A and 4B show an example of the plug 450 to connect to the plug receptacle 340 of FIGS. 3A and 3B. FIG. 4A shows the connection side of the plug 450. The plug 450 includes four metal prongs 452 to connect to or otherwise contact the four main electrical contacts 342 of the plug receptacle 340. Two of the metal prongs 452 are to contact the main electrical contacts of the plug receptacle 340 connected to the high and low pole of the battery system 120, and two of the metal prongs 452 are to contact the main electrical contacts of the plug receptacle 340 connected to the load bus 226. The plug 450 includes electrical interconnect between the prongs for contacting the battery system 120 and the prongs for contacting the load bus 226. This electrical interconnect is rated for the high energy coming from the battery system (e.g., rated for 300 Amps or greater). In this way, the plug 450 completes the double-switched circuit path between the battery system 120 and the load bus 226.

The plug 450 also includes two metal prongs 454 to contact the two auxiliary electrical contacts 344 of the plug receptacle 340. The plug 450 includes electrical interconnect between the two metal prongs 454 to complete the HVIL connection and provide the single-switch circuit path of FIG. 2. The electrical interconnect between metal prongs 454 can be rated lower than the electrical interconnect between the metal prongs 452 for the main electrical contacts because the HVIL connection is a lower voltage and current path.

The two metal prongs 454 for the HVIL connection have a different length than the four metal prongs for the main connection. When the plug 450 is inserted into the plug receptacle 340, the four metal prongs 452 contact the main electrical contacts 342 of the plug receptacle 340 first, before the fifth and sixth prongs 454 contact the auxiliary electrical contacts 344 of the plug receptacle 340. When the plug 450 is pulled from the plug receptacle 340, the fifth and sixth prongs 454 disconnect from the auxiliary electrical contacts 344 before the disconnect four main metal prongs 452 disconnect from the main electrical contacts 342 of the plug receptacle 340.

FIG. 4B shows the top side of the plug 450. The plug 450 includes a hinged lever 456 that pivots about a pin 458. As shown in FIGS. 3A and 3B, the plug receptacle 340 includes a housing 346 that includes pins 348 extending away from the housing 346.

FIG. 4B shows that the hinged lever 456 includes a slot 460 that engages pins 348 of the plug receptacle 340. Closing the hinged lever 456 engages the pins 348 to pull the plug 450 toward the plug receptacle 340. The hinged lever 456 provides additional insertion force on the plug 450 that may be needed based on the size of the prongs 452. The plug 450 and plug receptacle 340 may include a seal to environmentally seal the electrical contacts and electrical interconnect when the hinged lever 456 is closed (e.g., to form a water-tight connection).

For lockout/tagout, the plug 450 can be replaced by a cover that covers the plug receptacle 340 and prevents electrical continuity among the contacts 342, 344 of the plug receptacle 340. The lockout/tagout cover may not have any metal prongs, or the lockout/tagout cover may include nonconductive prongs, or the lockout/tagout cover may have conductive prongs but no electrical interconnect between the prongs.

Figure 5A:
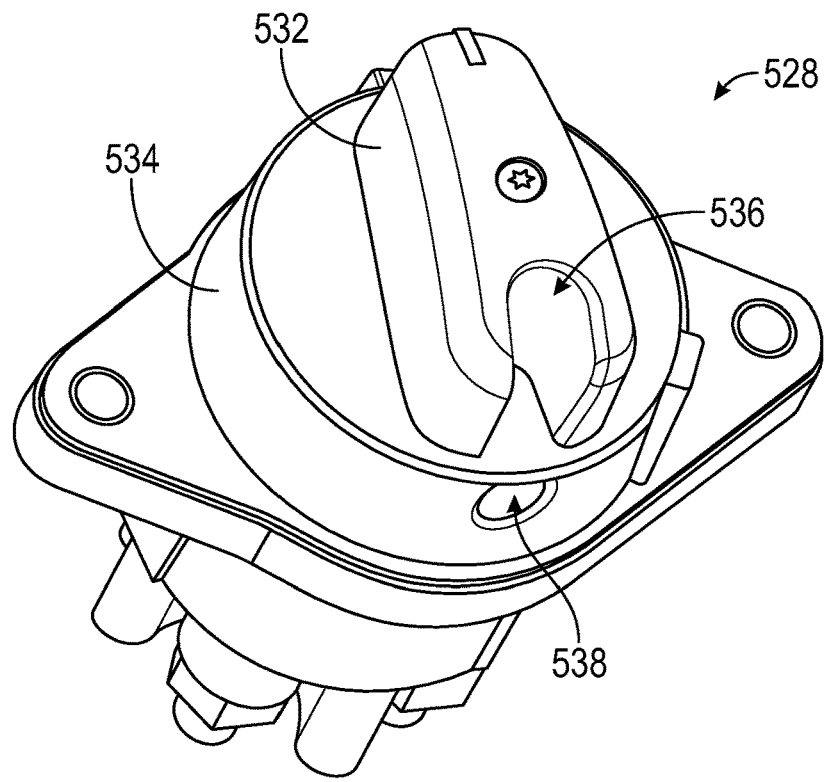
FIGS. 5A and 5B are an example of a rotary high current electrical connector in accordance with this disclosure.
Figure 5B:
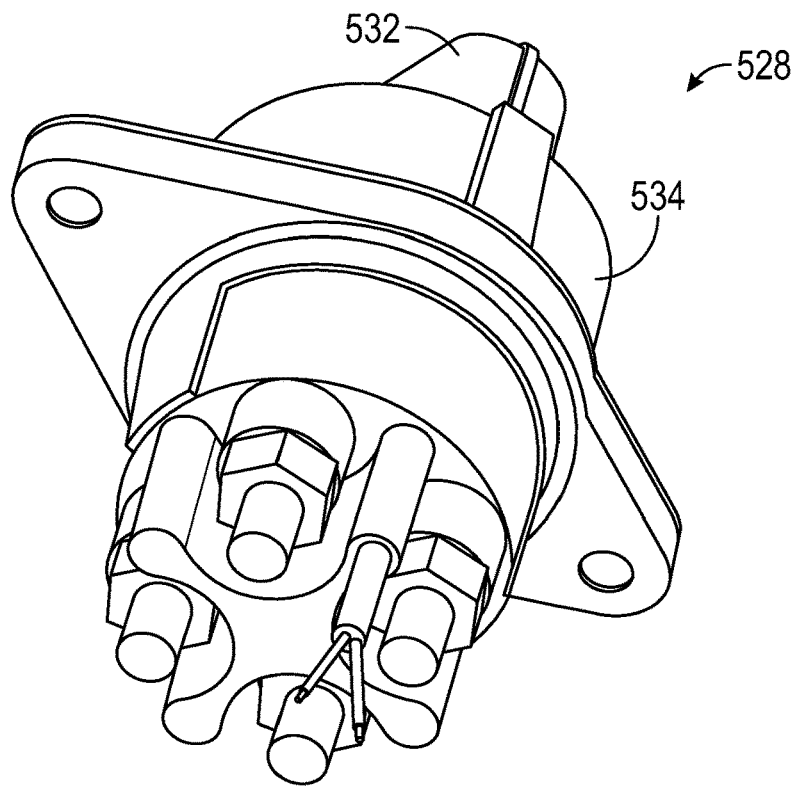

FIGS. 5A and 5B show an example of a rotary DPST switch 528 that can be used as the DPST switch 228 in FIG. 2. The rotary DPST switch 528 can include four contacts for the dual-switched circuit path and two auxiliary contacts for the single-switched circuit path of the DPST switch 228. Turning the rotary DPST switch 528 in a first direction connects the high pole and low pole of the battery system 120 to the load bus 226, and also connects the HVIL circuit 230. The HVIL circuit 230 may be connected after the high pole and the low pole are connected to the load bus 226. Turning the rotary DPST switch 528 in a second direction opposite to the first direction disconnects the HVIL circuit 230 and disconnects the high pole and low pole of the battery system 120 from the load bus 226. The HVIL circuit 230 may be disconnected before the high pole and the low pole are disconnected from the load bus 226. The electrical contacts of the rotary DPST switch 528 are rated for 300 Amps or greater and 700V or greater.

The rotary DPST switch 528 includes a housing that is environmentally sealed. In certain examples, the housing is watertight. The housing of the rotary DPST switch 528 includes a stationary housing portion 534 and a turn-able housing portion 532 that is movable relative to the stationary housing portion 534 when the rotary DPST switch 528 is turned. The turn-able housing portion 532 is shaped to include a groove 536 and the stationary housing portion 534 includes a hole 538. The shackle of a lock (e.g., a padlock) can be placed in the groove 536 and through the hole 538 of the housing to prevent movement of the turn-able housing portion relative to the stationary housing portion. This provides for lockout/tagout of the rotary DPST switch 528.

INDUSTRIAL APPLICABILITY

In an operating example of an energy source for a mobile work machine according to this disclosure, it is desired for technicians or other maintenance workers to perform maintenance on the work machine. The high-capacity energy source can be battery-based, or fuel-cell based, and does not shut off like a combustion engine. When maintenance is to be performed on the work machine, it is desired to protect the workers from coming into contact with the high voltage and high current of the energy source.

A single point of connection between the energy source and the working circuits and electric motors of the work machine is provided as connector having a DPST switch. The connector is disconnected and the DPST switch is opened to isolate the energy source form the rest of the work machine during maintenance. The connector can be provisioned for lockout/tagout procedures to prevent the reconnection of the energy source until it is safe. The dual pole isolation of the energy source completely isolates the energy source as compared to a single pole isolation approach. The dual pole isolation reduces the number of lockout/tagout steps needed. When the maintenance is completed, the connector can be reconnected and the DPST switch closed to restore electrical energy to the working circuits and electrical motors of the work machine.

The above detailed description is intended to be illustrative, and not restrictive. The scope of the disclosure should, therefore, be determined with references to the appended claims, along with the full scope of equivalents to which such claims are entitled.

What is claimed is:

1. An energy source for a work machine, the energy source comprising:
   multiple battery cells connectable in one or both of series and parallel to form a battery system having a high pole and a low pole;
   a load bus to distribute energy from the battery system to the work machine; and
   a single point of connection between the battery system and the load bus, wherein the single point of connection is a connector including:
   a dual-pole single-throw (DPST) switch including:
   a dual-switched circuit path to connect the high pole and the low pole to the load bus; and
   a single-switched circuit path to provide a switched connection of a high voltage interlock loop (HVIL) circuit;
   wherein when closing the DPST switch of the connector, the HVIL circuit is connected after the high pole and the low pole are connected to the load bus; and
   wherein when opening the DPST switch, the HVIL circuit is disconnected before the high pole and the low pole are disconnected from the load bus.

2. The energy source of claim 1, wherein an output voltage of the battery system is greater than or equal to seven hundred volts (700V) and three hundred amperes (300 A).

3. The energy source of claim 1, wherein the connector includes:

a plug receptacle including:
a first electrical contact connected to the high pole;
a second electrical contact connected to the low pole;
third and fourth electrical contacts connected to the load bus; and
fifth and sixth electrical contacts for the single switched circuit path;
a plug including:
first, second, third, and fourth metal prongs to contact the first, second, third, and fourth electrical contacts, respectively;
first electrical interconnect between the first prong and third prong and between the second prong and fourth prong, wherein the first electrical interconnect is rated to three hundred amperes (300 A) or greater; and
fifth and sixth metal prongs to contact the fifth and sixth electrical contacts, respectively, and second electrical interconnect between the fifth and sixth metal prongs; and
wherein when inserting the plug into the plug receptacle, the first, second, third, and fourth metal prongs contact a corresponding electrical contact of the plug receptacle before the fifth and sixth metal prongs.

4. The energy source of claim 3,
wherein the plug receptacle of the connector includes a housing and pins extending away from the housing; and
wherein the plug of the connector includes a hinged lever that engages the pins to pull the plug toward the plug receptacle when the hinged lever is closed.

5. The energy source of claim 4, wherein the connector includes a lockout/tagout cover for the plug receptacle that prevents electrical continuity among the contacts of the plug receptacle.

6. The energy source of claim 1,
wherein the DPST switch of the connector is a rotary DPST switch;
wherein turning the rotary DPST switch in a first direction connects the HVIL circuit after connecting the high pole and the low pole to the load bus; and
wherein turning the rotary DPST switch in a second direction disconnects HVIL circuit before disconnecting the high pole and the low pole from the load bus.

7. The energy source of claim 6, wherein the rotary DPST switch includes a housing, and the housing includes:
a stationary housing portion and a turn-able housing portion movable relative to the stationary housing portion to turn the rotary DPST switch; and
wherein the turn-able housing portion and the stationary housing portion are shaped to receive a lock shackle to prevent movement of the turn-able housing portion relative to the stationary housing portion.

8. The energy source of claim 6, wherein the housing of the rotary DPST switch is environmentally sealed.

9. The energy source of claim 6, wherein the rotary DPST switch is rated to three hundred amperes (300 A) or greater and seven hundred volts (700V) or greater.

10. A high current electrical connector for connecting a large-capacity energy source to a work machine, the connector comprising:
a dual-pole single-throw (DPST) switch including:
first and second contacts to be connected to a first pole and a second pole of the large-capacity energy source;
third and fourth contacts to be connected to electrical circuits of the work machine, wherein the first, second, third, and fourth contacts are rated for three hundred amperes (300 A) or greater and seven hundred volts (700V) or greater; and
fifth and sixth contacts to connect a high voltage interlock loop (HVIL) circuit to the connector;
wherein when closing the DPST switch, the fifth contact is connected to the sixth contact after the first contact is connected to the third contact and the second contact is connected to the fourth contact; and
wherein when opening the DPST switch, the fifth contact is disconnected from the sixth contact before the first contact is disconnected from the third contact and the second contact is disconnected from the fourth contact.

11. The connector of claim 10, wherein the connector includes:
a plug receptacle including the first through sixth contacts; and
a plug including:
first, second, third, fourth, fifth and sixth metal prongs to contact the first, second, third, fourth, fifth, and sixth contacts respectively, wherein the plug provides electrical continuity between the first and third contacts, between the second and fourth contacts, and between the fifth and sixth contacts; and
wherein when inserting the plug into the plug receptacle contact is made to the first, second, third, and fourth prongs before contact is made to the fifth and sixth prongs.

12. The connector of claim 11,
wherein the plug receptacle includes a housing and pins extending away from the housing; and
wherein the plug includes a hinged lever that engages the pins to pull the plug toward the plug receptacle when the hinged lever is closed.

13. The connector of claim 11, including a lockout/tagout cover for the plug receptacle that prevents electrical continuity among the contacts of the plug receptacle.

14. The connector of claim 10,
wherein the DPST switch is a rotary DPST switch;
wherein turning the rotary DPST switch in a first direction connects the fifth contact to the sixth contact after connecting the first contact to the third contact and the second contact to the fourth contact; and
wherein turning the rotary DPST switch in a second direction disconnects the fifth contact from the sixth contact before disconnecting the first contact from the third contact and the second contact from the fourth contact.

15. The connector of claim 14, including a housing covering the contacts of the rotary DPST switch, wherein the housing includes:
a stationary housing portion and a turn-able housing portion movable relative to the stationary housing portion to turn the rotary DPST switch; and
wherein the turn-able housing portion and the stationary housing portion are shaped to receive a lock shackle to prevent movement of the turn-able housing portion relative to the stationary housing portion.

16. A dual pole electrical connector, the connector comprising:
a dual-pole single-throw (DPST) switch rated to seven hundred volts (700V) or higher, the DPST switch including:
first and second contacts to be connected to a first pole and a second pole of an energy source;
third and fourth contacts to be connected to electrical circuits of the work machine; and
fifth and sixth contacts to connect a high voltage interlock loop (HVIL) circuit to the connector;

wherein when closing the DPST switch, the fifth contact is connected to the sixth contact after the first contact is connected to the third contact and the second contact is connected to the fourth contact; and wherein when opening the DPST switch, the fifth contact is disconnected from the sixth contact before the first contact is disconnected from the third contact and the second contact is disconnected from the fourth contact.

17. The connector of claim 16, including:

a plug receptacle including the first through sixth contacts; and a plug including:

first, second, third, fourth, fifth and sixth metal prongs to contact the first, second, third, fourth, fifth, and sixth contacts respectively;

a hinged lever that pulls the plug toward the plug receptacle when the hinged lever is closed; and wherein closing the lever provides electrical continuity through the plug between the first and third contacts and between the second and fourth contacts, before providing electrical continuity between the fifth and sixth contacts.

18. The connector of claim 16, wherein the DPST switch is a rotary DPST switch;

wherein turning the rotary DPST switch in a first direction connects the fifth contact to the sixth contact after connecting the first contact to the third contact and the second contact to the fourth contact; and wherein turning the rotary DPST switch in a second direction disconnects the fifth contact from the sixth contact before disconnecting the first contact from the third contact and the second contact from the fourth contact.

* * * * *